United States Patent [19]
Le Herisse

[11] Patent Number: 6,111,543
[45] Date of Patent: Aug. 29, 2000

[54] METHOD AND DEVICE FOR ANALYSING RADIO NAVIGATION SIGNALS

[76] Inventor: Pascal Le Herisse, 33 avenue de la République, 94300 Vincennes, France

[21] Appl. No.: 08/913,303
[22] PCT Filed: Mar. 12, 1996
[86] PCT No.: PCT/FR96/00384
§ 371 Date: Sep. 11, 1997
§ 102(e) Date: Sep. 11, 1997
[87] PCT Pub. No.: WO96/28746
PCT Pub. Date: Sep. 19, 1996

[30] Foreign Application Priority Data

Mar. 13, 1995 [FR] France ................................. 95 02870

[51] Int. Cl.[7] ................. G01S 1/16; G01S 1/18
[52] U.S. Cl. .................... 342/413; 342/404; 342/412
[58] Field of Search ..................... 342/401, 404, 342/411, 413, 412

[56] References Cited

U.S. PATENT DOCUMENTS 3,685,053  8/1972  Kirkpatrick .
4,414,632  11/1983  Murrell .

FOREIGN PATENT DOCUMENTS 31 31 494  2/1983  Germany .
2 270 226  3/1994  United Kingdom .

*Primary Examiner*—Theodore M. Blum
*Attorney, Agent, or Firm*—Young & Thompson

[57] ABSTRACT

A beacon transmission signal comprises at least one carrier (C+SB) including sidebands (SB) and one sideband only signal (SBO), said carrier and said signal being in any mutual phase relationship. The method of the invention includes the steps of demodulating the sum of the carrier (C+SB) and of the signal (SBO), on one hand by multiplying it by a frequency (F), and on the other hand by multiplying it by the same frequency in phase quadrature, extracting from the products continuous components representative of the carrier portion (C) of said carrier (C+SB) and the low frequency components of the beacon transmission signal representative of the sideband portions (SB) of the carrier (C+SB) and of the signal (SBO), calculating the module and phase of portion (C) of the carrier (C+SB) and deriving from the low frequency components the amplitudes of the sidebands (SB) and the amplitude and phase of the signal (SBO).

15 Claims, 6 Drawing Sheets

METHOD AND DEVICE FOR ANALYSING RADIO NAVIGATION SIGNALS

The present invention concerns a method and a device for analysing signals radiated by radio navigation stations, of the "ILS" and "VOR" type, for example, supplying values characteristic of elementary signals constituting the guidance information signals transmitted by said stations.

BACKGROUND OF THE INVENTION

"ILS" type stations comprise three sub-stations:

the "Localiser" station supplies information on the angular error relative to the runway axis, the "Glide Path" station supplies information on the angular error relative to a glide path, the "marker" stations provide information on the distance from the runway threshold.

The angular error information is measured from the difference of the depth of modulation (DDM) of two frequencies, 90 Hz and 150 Hz.

Standard or Doppler type "VOR" beacons supply information on the angular error relative to a reference tied to magnetic North. The angular error information is measured from the phase difference between a 30 Hz reference signal and a variable 30 Hz signal.

ILS and VOR beacons conform to international standards and specifications published by the International Civil Aviation Organisation (ICAO), and in particular in the documents known as "appendix 10" and "appendix 8071" volumes 1 and 2.

Radio navigation beacons (or stations) comprise a number of functional units. When associated with and adjusted to each other, these units supply guidance signals to aircraft.

The components of a beacon are as follows:

a "power" unit supplying all the power supply voltages required by the other units, a "signal generator" unit supplying low-frequency signals, known as information signals, and radio-frequency signals, known as carrier signals. These L.F. and R.F. signals have pure sinusoidal waveforms, a "distribution" unit for distributing and mixing signals from the "generator" unit to the transmit antenna(s), a "radiator" unit comprising one or more antennas. These can be fed with one or more types of signals generated by the "generator" unit, a "sensor" unit made up of antennas juxtaposed with or at a distance from the antennas. They are called couplers, nearfield sensors or farfield sensors. The sensors are associated ith a "recombine" unit, a "monitor" unit for measuring parameters radiated by the generator, distributor and radiator units, for x channels, a "decision" unit for synthesising the x channels of the "monitor" unit to decide to shut down the station or to switch to a back-up transmitter.

The sensor, monitor and decision unit are responsible for the "monitoring" function monitoring the integrity of the signals transmitted.

The complexity of a system of this kind requires a high level of technical knowledge on the part of personnel responsible for using and maintaining it. This personnel is also required to use many measuring instruments.

Some of the parameters for diagnosing a fault or a variation in the information transmitted by the stations are inaccessible. For example: the phase and the amplitude of SBO signals, the frequency and amplitude error of the various transmitters forming part of the beacon.

Operators must intervene physically on the connections between the functional units, which necessarily interrupts the use of the beacon by aircraft, which reduces the availability of the beacon.

The signals transmitted by the beacons on one channel are made up of a plurality of sources called C+SB, meaning carrier and sidebands, and SBO, meaning sidebands only. These radio sources must be locked to a plurality of frequencies within the same channel. The beacons are typically single-frequency or dual-frequency beacons depending on the number of radio frequencies that they transmit.

The C+SB and SBO signals are generated by forming the product of the radio frequency signals with low frequency signals and a DC component, which constitutes amplitude modulation.

To give one, non-limiting example, the characteristic equation of the guidance signal x(t) radiated by an ILS type beacon can take the following form:

$$x(t) = A*\cos(2\pi*F0*t+\Phi\_CSB0)*[1+m1\ \sin(2\pi*f1*t)+m2\ \sin(2\pi*f2*t+\Phi 2)+m3\ \sin(2\pi*f3*t)+m4\ \sin(2\pi*f4*t)]+B*\cos(2\pi*F0*t+\Phi\_SBO0)*[m1'\ \sin(2\pi*f1*t)+m2'\ \sin(2\pi*f2*t+\Phi 2)]+C*\cos(2\pi*F1*t+\Phi\_CSB1)*[1+m1''\ \sin(2\pi*f1*t)+m2''\ \sin(2\pi*f2*t+\Phi 2)+m3''\ \sin(2\pi*f3*t)+m4''\ \sin(2\pi*f4*t)]+D*\cos(2\pi*F1*t+\Phi\_SBO1)*[m1'''\ \sin(2\pi*f1*t)+m2'''\ \sin(2\pi*f2*t+\Phi 2)]$$

in which:

A represents the amplitude of the C+SB signal at radio frequency F0 having a phase $\Phi\_CSB0$, B represents the amplitude of the SBO signal at radio frequency F0 having a phase $\Phi\_SBO0$, C represents the amplitude of the C+SB signal at radio frequency F1 having a phase $\Phi\_CSB1$, D represents the amplitude of the SBO signal at radio frequency F1 having a phase $\Phi\_SBO1$, F0 and F1 represent the frequencies of the radio frequency signals. Hereinafter, Fn designates a radio frequency signal of any frequency, f1, f2, f3, f4 represent the frequencies of the low frequency signals modulating the radio frequency signals F0, F1 and Fn. Hereinafter, fn designates a low frequency signal of any frequency, m1, m1', m1", m1''' represent the depth of modulation of the low frequency f1, generally f1=90 Hz for ILS and 30 Hz for VOR, m2, m2', m2", m2''' represent the depth of modulation of the low frequency f2, generally f2=150 Hz for ILS and 9 960 Hz for VOR, Note that in the VOR case the signal at frequency f2 is frequency modulated and therefore has a slightly different equation, m3, m3', m3", m3''' represent the depth of modulation of the low frequency f3, generally f3=1 020 Hz for ILS and for VOR, m4, m4', m4", m4''' represent the depth of modulation of a speech signal in the 300 Hz to 3 000 Hz band, $\Phi 2$ represents the phase error of the LF signals at frequency f1=90 Hz and f2=150 Hz.

The difficulty of analysing the signals stems from the fact that:

the signals C+SB and SBO are on identical radio frequencies. A and B are at the frequency F0, C and D are at the frequency F1, and so on for the other carriers.

the LF signals modulating the C+SB and SBO channels can also be at identical frequencies: f1, f2, fn, the depth of modulation being different. The receiver then sees an overall depth of modulation which prevents it distinguishing the contribution of a faulty transmitter.

in the case of a plurality of carriers within the same channel, the frequency difference is intentionally limited to a few kHz to profit from the capture effect at the ILS receivers. With equipment of the present generation, this capture effect prevents identification of the transmitter which is the source of a fault.

For all these reasons the modes of demodulation employed are not suitable for observation of the basic components of the signals, either within the stations or outside the stations when they are radiated by the antennas.

The methods employed at present use measurement channels characterised by quadratic demodulation. The global depth of modulation measured does not allow the contribution of a particular transmitter to be identified so that a faulty transmitter can be identified, i.e. the part stemming from the signal C+SB and the part stemming from the signal SBO. Moreover, they are unable to extract any information as to the phase of SBO relative to C+SB.

Other than quadratic demodulation, another method is used in some equipment to extract the phase and the level of the SBO signals relative to the C+SB signals. These systems operate by sampling a so-called "reference" signal at one of the transmitters of the station and adding it to the signal to be analyzed after subjecting it to a plurality of known phase-shifts. This principle has at least two major drawbacks:

by definition, it necessitates the use of the station reference signal generated within the transmitter and not transmitted. It therefore rules out the use of the method at any distance from the station, and thus in particular in onboard radio navigation receivers.

it necessitates switching a phase-shifter by several steps, and this for all the channels to be monitored, which rules out continuous operation in so-called "real time" because information is lost between switching operations and between each scanning of one channel relative to the others.

In the case of a plurality of radio carriers, for example in the case of dual-frequency stations, no distinction is drawn between the information specific to each carrier. The resultant signal is proportional to the relative field level of the radio carriers. This characteristic of quadratic demodulators is used and is known as the capture effect. It enables signals to be radiated that are specific to a plurality of angular sectors around the stations. Nevertheless, if a jamming signal is present on the channel selected for the beacon, the position angular signal is degraded by the presence of the jamming signal. The jamming signal can have various origins, either a transmitter independent of the beacon, for example an FM broadcasting station, or the beacon itself, this phenomenon being known as "multipath". In the multipath situation, the receiver receives a signal made up of a signal from the "direct path" between it and the beacon and signals reflected from obstacles, known as "reflected path" signals. Current methods do not enable direct signals to be distinguished from reflected signals.

All these limitations of current generation equipment restrict the effectiveness of the beacon maintenance resources. Moreover, these limitations are also found in the devices for monitoring the integrity of the radiated signals (the "monitors") and in the onboard receivers of navigation systems, and reduce their performance.

Objects of the invention

One object of the present invention is therefore to provide a method and a device for analysing radio navigation signals that do not have the limitations of the prior art methods and devices and which, in particular, enable users:

to obtain all of the parameters to be measured without affecting the operation of the beacons by interrupting the radio signals transmitted to the aircraft;

to locate a fault or faults, a variation or variations in parameters that has or have caused or could subsequently cause degradation of the information transmitted to users, without having to execute a complex measurement protocol;

to record the components of the transmitted signals in real time and to provide alarm information in the event of violation of thresholds set by the I.C.A.O. standards and by users, so as to conform not only to the standards but also to the recommendations of the standardisation organisations;

to detect the presence of jamming signals, to reduce susceptibility to jamming, thereby reducing the error rate of guidance signals and advising users of the presence of such interference, whether the sources of jamming signals are independent of the beacon or dependent on the beacon and therefore of a "multipath" nature.

Another aim of the present invention is to provide a method of the above kind and a device of the above kind employed for radio navigation proper in aircraft rather than only for maintaining and monitoring the integrity of ground stations.

The above aims of the invention are achieved by a method of analysing transmissions from a radio navigation beacon, these transmissions comprising at least one carrier (C+SB) comprising side bands (SB) and a side band only signal (SBO), said carrier and said signal having any phase relationship, wherein:

the sum of the carrier (C+SB) and the signal (SBO) is demodulated by multiplication with a frequency (F) and with the same frequency in phase quadrature, the DC components representative of the part (C) of the carrier (C+SB) and the low-frequency components from the beacon representative of the SB parts of (C+SB) and (SBO) are extracted from these products, the modulus and the phase of the part C of the carrier (C+SB) are calculated, and the amplitude of the side bands (SB) and the amplitude and the phase of the signal (SBO) are deduced from the low-frequency components.

The multifrequency phase quadrature demodulation effected in accordance with the present invention extracts from the radio navigation signals information that is enriched by a deeper knowledge of the characteristics of the basic components of the radio navigation signals, this enriched information being used for maintaining or for monitoring the integrity of the radiation from the beacon or to guide aircraft, depending on the intended application.

For the implementation of the above method, the invention provides a device comprising:

a) multiplier means for demodulating the sum of the carrier (C+SB) and the signal (SBO) by multiplication with a frequency (F) and with the same frequency in phase quadrature, b) filter means for extracting from these products the DC components representative of the (C) part of the carrier (C +SB) and signal SBO, and c) means for calculating the modulus and the phase of the part C of the carrier (C+SB), the amplitude of the side bands (SB) and the amplitude and the phase of the signal (SBO) from the low-frequency components of the transmissions from the beacon.

DESCRIPTION OF THE DRAWINGS

Other features and advantages of the present invention will emerge from a reading of the following description and from an examination of the accompanying drawings, in which.

Identical components in the various figures that assure the same functions carry the same reference numbers and are described only once.

DESCRIPTION OF THE INVENTION

A beacon conventionally comprises a signal generator electronic unit supplying the signals C+SB and SBO and a distributor unit which feeds antennas. To monitor the emission from the antennas, sensors are placed in the field of the antennas, these sensors feeding a recombiner circuit. The signals from this circuit feed monitor channels which deactivate the transmit unit if a fault is detected in the output from the sensors. The signals transmitted by the beacon are used in radio navigation receivers onboard aircraft.

The present invention applies double demodulation, i.e. demodulation on an in-phase channel known as the cosine channel and demodulation on a phase quadrature channel known as the sine channel. This demodulation is effected on as many radio frequencies as there exist within a channel and at as many measurement points as is necessary to establish a location of the source of a fault.

The following description concerns firstly a two-frequency analyser device incorporated in a radio navigation receiver. A beacon incorporating several such devices installed at the same number of measurement points of the beacon will then be described.

The method of the invention enables the signals transmitted by the beacons to be analysed directly or after they have been subjected to one or more transformations. The aim of such transformations is to adapt the physical parameters of the signal analysed to the technology of the devices implementing the method of the invention. These transformations of the radiated signals are, for example, amplification, mixing with a frequency to transpose the analysed signals to an intermediate frequency "IF". The remainder of the present description therefore uses the expressions "beacon signal" and "analysed signal" interchangeably in referring either to the signal radiated directly by the beacon or to the transformed signal.

Figure 1:
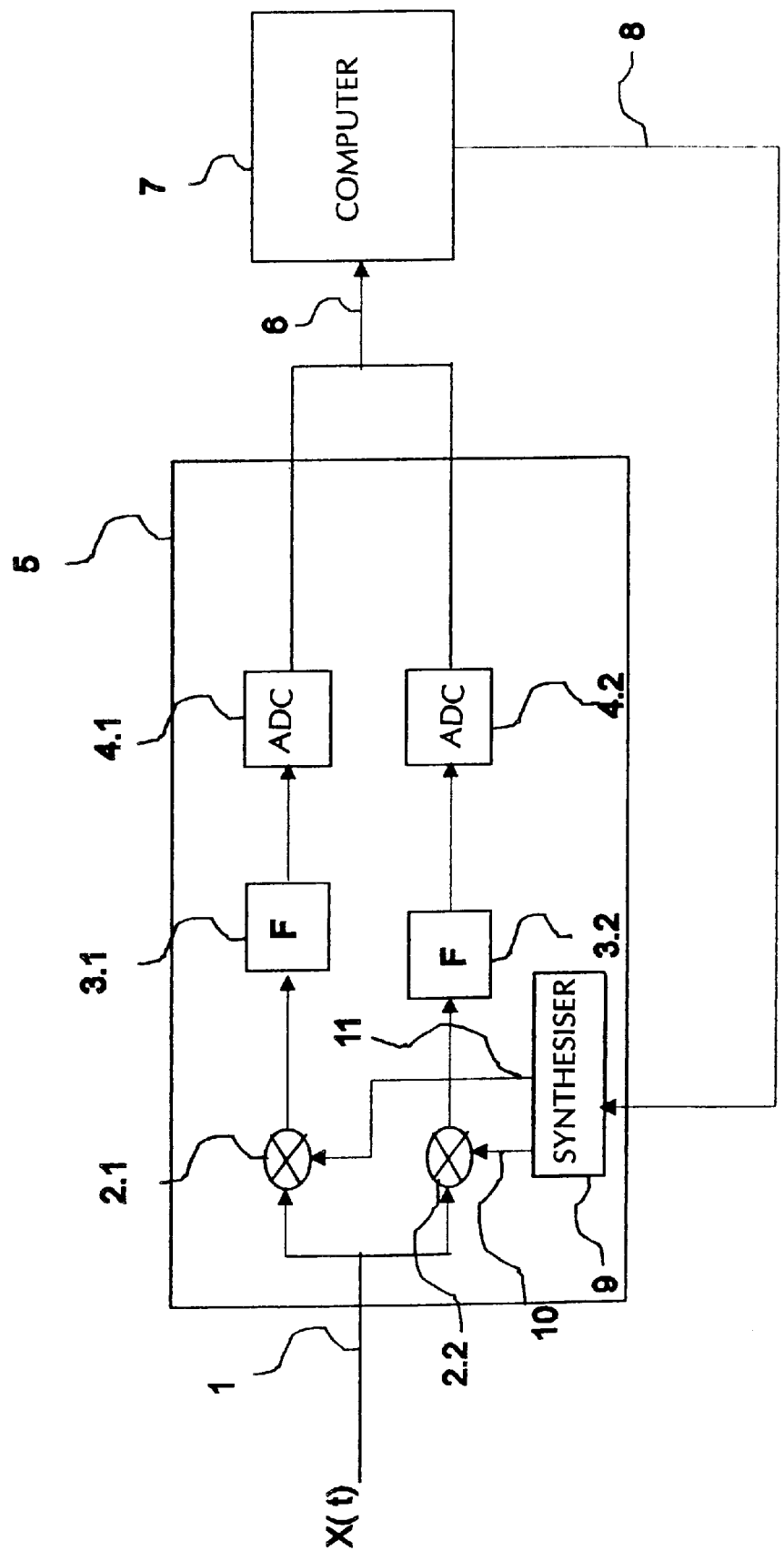
FIG. 1 is a functional block diagram showing the method of the invention for analysing radio navigation signals, FIG. 2 combines a plurality of vector representations of the basic components of the C+SB and SBO signals used in describing the method of the invention.

FIG. 1 of the accompanying drawing is a schematic representation of the basic principle of the method of the invention.

The x(t) type signal to be analysed, the equation of which is given in the preamble to the present description, and which is shown at the input 1, is injected into one of the inputs of each of two multipliers 2.1 and 2.2. The multipliers receive signals from a synthesiser 9 at a second input This synthesiser is a direct digital synthesiser (DDS), for example, although any other controllable frequency device can be used. This synthesiser conventionally delivering two carriers in phase quadrature respectively called the "cosine output" and the "sine output", the signal at the cosine output 10 is at the same frequency F as the signal x(t) and the signal at the sine output 11 is also at the frequency F but in phase quadrature to the signal at 10. The outputs of the multipliers are injected into lowpass filters 3.1 and 3.2. These operations of multiplication and filtering constitute demodulation of the signal x(t). The low-pass filters feed analoguedigital converters 4.1 and 4.2.

Conventionally, in prior art receivers, the pass-bands of the intermediate frequency IF filters are several kHz to enable the use of two frequency stations and to assure the capture effect. The bandwidth of the IF filters makes radio navigation receivers highly susceptible to jamming signals on the same frequencies. The present invention limits the risk of jamming by reducing the pass-bands of the low-pass filters 3.1 and 3.2 to what is strictly necessary, namely the maximum low frequency LF from f1, f2, f3 or fn. The signal to noise ratio is also improved because it varies in accordance with the formula 10 Log (B2/B1), B2 being the new bandwidth and B1 the bandwidth conventionally used.

For the "Glide Path", for example, the frequency difference of the transmitters can be 30 kHz, i.e. the standard value for B1. The maximum LF frequencies to be analysed correspond to 150 Hz. The invention intentionally takes a small margin (300 Hz) on the capture frequency of the filters 3.1 and 3.2 in order not to compromise the measurements on the 150 Hz signal, representing an improvement in the gain of 10 * Log (300/30 000), or 20 dB.

The data sampled at a sampling frequency Sam_freq at the output of the converters and representative of the signal x(t) are transmitted to a digital computer 7 via a digital bus 6. The data from the branch with the multiplier 2.2 fed by the cosine output 10 is arbitrarily called the "cosine component" or "cosine channel". Similarly, the data from the branch fed by the sine output 11 is called the "sine component" or "sine channel".

The function implemented in accordance with the invention by the unit 5 comprising the multipliers, the synthesiser, the low-pass filters and the analogue-digital converters is called phase quadrature demodulation. If a plurality of units 5 are connected in parallel to an input 1, the function is called phase quadrature multifrequency demodulation.

The computer controls the synthesiser 9 via the control bus 8. It performs all of the processing necessary for extracting the basic components of the signal, in a plurality of steps:

searching for the carriers present in the signal,
filtering the DC component and the low-frequency components f1 through fn,
characterising the elementary components of the signal in terms of level, phase and frequency, calculating the frequency and level spacings of the carriers, servo-locking the carriers, calculations specific to the guidance of aircraft equipped with a radio navigation receiver including the device of the invention.

For the sake of simplicity, it is initially assumed that the frequencies of the synthesiser(s) are locked to the frequencies of the signals to be analysed. The "search for carriers" step will be described later.

Filtering of the DC component and the low-frequency components f1 through fn.

The analysis method of the invention can be executed by analogue or digital processing of the signals concerned.

For analogue processing, the filter function can be implemented by means of a low-pass filter for the DC component and several band-pass filters centred on the frequencies f1 through fn. The output of these filters is rectified to supply a level proportional to the filtered frequencies. Each of the filtered and rectified components is then sampled and transmitted to the computer which then performs all of the necessary analysis steps.

For digital processing, described in full below by way of example, various digital filtering techniques can be employed to extract the amplitudes of the DC component and each of the low-frequency components f1 through fn. By way of non-limiting example, a fast Fourier transform (FFT) is used here.

A sequence of n samples of the signal x(t) is stored, the block of n points thus constituted is multiplied by a weighting function and the fast Fourier transform is calculated using prior art algorithms. The FFT calculation therefore yields a table of length n in which each element represents the amplitude and in which the index of the table represents the frequency, in accordance with the equation Frequency= index * Sam_freq/n. The sampling frequency Sam_freq and the number n of points sampled are carefully chosen so that the result of dividing Sam_freq by n is a sub-multiple of the frequencies to be analysed. By way of non-limiting example, the LF signals of ILS and VOR beacons have a common frequency of 30 Hz. To enhance the resolution of the FFT calculation equivalent filters, a sub-multiple of 30 Hz is used, for example 15 Hz, and, by design, Sam_freq/ n=15 Hz, so that Sam_freq=7 680 Hz if n=512 points.

According to Shannon's theorem, the maximum analysis frequency of this block is Sam_freq/2. To analyse the whole of a channel it is necessary either to use a high sampling frequency or to proceed in several stages. The latter option is usually adopted to minimise the calculation time and to benefit from the filtering effects of the low-pass filters.

The amplitude values obtained for each frequency component are subject to an amplitude error and a frequency error. Interpolation calculations are then performed on the FFT results.

The interpolation calculations are effected on the DC component and on each of the LF frequencies analysed to allow for the fact that they are not synchronised to the sampling frequency and that their own frequency can vary within or outside limits set by the standards and the recommendations.

The non-synchronism of the frequencies f1, f2 . . . fn relative to the elementary frequency components given by the equation: Frequency=index * Sam_freq/n, obtained from the FFT calculation, leads to measurement errors and has a great effect on the accuracy of the method used if due allowance is not made. The invention proposes the following procedure for the interpolation calculation:

1, the basic $\Delta\_f$ is calculated as:

$$\Delta\_f = \text{Sam\_freq}/(2*n),$$

2, three samples around the frequency fn to be measured are sampled in the data table obtained by filtering. The samples have index n−1, n̲ and n+1, n̲ being the sample at the frequency nearest the frequency of the component fn searched for, 3, the samples with index n−1 and n+1 are compared to determine if the actual frequency is above or below the sample with the central index n̲. If the sample n+1 is above the sample n−1, then the actual frequency is higher than that of the sample with index n̲, otherwise it is lower, 4, $\Delta\_f$ is added to or subtracted from the frequency with index n, 5, knowing the equation of the weighting function, the theoretical level of the signal is recalculated from level n̲ and the frequency error between the levels n̲ and n±$\Delta\_f$, 6, the value for the sample n+1 or n−1, depending on the position of fn, is calculated from this theoretical level, 7, if the error between the calculated value and the measured value with index n−1 or n+1 is lower, a new $\Delta\_f$ is calculated, i.e. $(\Delta\_f/2) \pm \Delta\_f$, 8, the cycle resumes from step 4, six to ten times depending on the required accuracy.

This search method by interpolation of maxima finds the real frequencies and amplitudes of the measured signal, even if they are not synchronised with the sampling frequency for the above reasons.

Characterisation of the elementary components of the signal in terms of level, phase, frequency.

This characteristic consists in calculating the modulus and the phase of the component C of the carrier (C+SB) and deducing from the low-frequency components the amplitude of the side bands (SB) and the amplitude and the phase of the signal (SBO).

FIGS. 2A through 2D show a plurality of vector representations of the basic components of the signals C+SB and SBO used in describing the method of the invention.

A signal C+SB made up of C and SB with phase $\Phi\_CSB$ is added to a signal SBO with phase $\Phi\_SBO$ to form a signal of type x(t). The numbers of signals SB, SBO and carrier C is intentionally limited to simplify the drawings, the principle being widely extendable to all frequencies in the selected channel.

Multiplying the signal x(t) by a signal at frequency F' produces two signals, one at frequency F−F' and the other at frequency F+F'. The component at frequency F+F' is eliminated by means of low-pass filters.

Figure 2A:
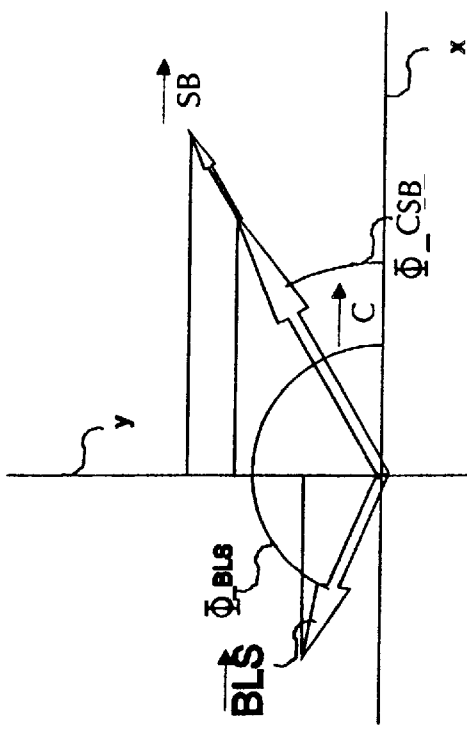

If F and F' can be the same frequency, the amplitude of the signal x(t) is then proportional to the cosine of the phase difference between the analysed signal x(t) at F and the mixer signal at F'. FIG. 2A shows that the effect of this operation is to project the vectors $$\vec{C}, \vec{SB} \text{ and } \vec{SBO}$$

onto the x axis. The signals then have the respective amplitudes cos_C, cos_SB and cos_SBO, defined as follows:

cos_C=C*cos $\Phi\_CSB$ cos_SB=SB*cos $\Phi\_CSB$ cos_SBO=SBO*cos $\Phi\_SBO$

C, SB and SBO being the moduli of the corresponding vectors.

Figure 2B:
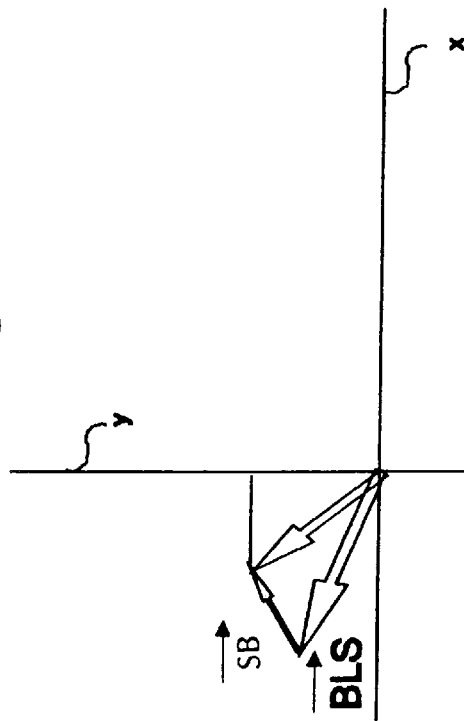

Similarly, in FIG. 2B, the product of a signal x(t) at frequency F by a mixer signal at frequency F' in phase quadrature with the previous F' projects the vectors $$\vec{C}, \vec{SB} \text{ and } \vec{SBO}$$

onto the y axis, respectively at sin__C, sin__SB and sin__SBO, defined by the above equations with the cosine operator replaced by the sine operator.

The amplitudes of the low frequency (LF) components f1 through fn resulting from filtering of the cosine channel correspond to transposed signals on the x axis of the vector diagrams from FIGS. 2A through 2D. Similarly, the amplitudes of the LF components f1 through fn obtained by filtering the sine channel correspond to signals transposed onto the y axis of the vector diagrams from FIGS. 2A through 2D.

The amplitude, i.e. the modulus, and the phase of each component are then determined using conventional trigonometrical calculations.

These calculations are applied to all of the LF and RF components originating from the analysed beacon, i.e. to all of the outputs of the various phase quadrature demodulators.

In the particular case of ILS beacons, the signals SB and SBO can be at identical low frequencies LF. They then form one and the same sum signal for each pair SB/SBO with the same frequency fn. The projections onto the x and y axes of the sum vector $$\vec{C} + \vec{SBO}$$

Figure 2C:
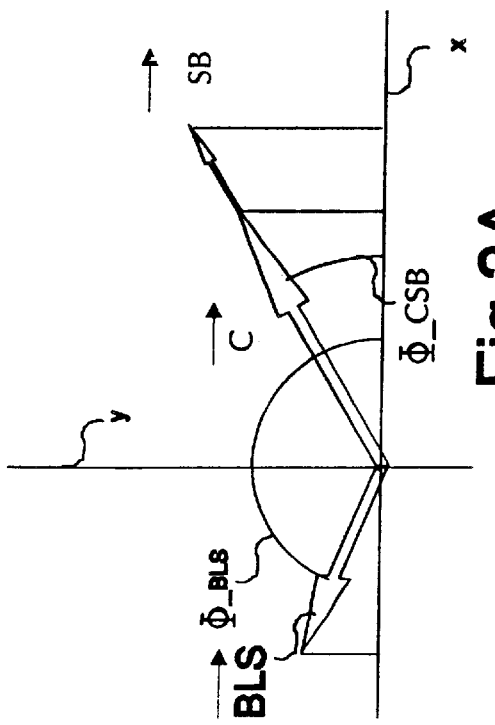
Figure 2D:
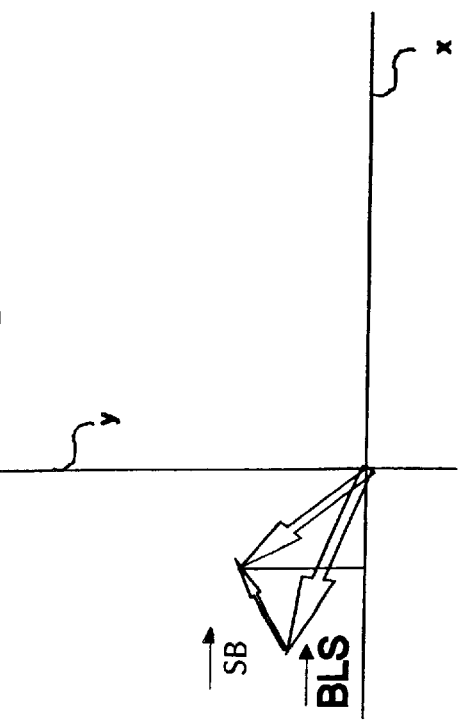

(FIGS. 2C and 2D) are respectively sin__sum (FIG. 2D) and cos__sum (FIG. 2C). One aim of the invention is to determine the contribution of each of the parts or components SB and SBO to a sum signal of this kind. The calculation to determine the amplitudes and phases of the signals SB and SBO is then effected on the basis of the characteristics of the signal SB. By its very nature, the phase of SB is identical to that of C.

If no particular measurement point is available, a default modulus is allocated, equal to 0.2×C for "Localiser" and 0.4×C for "Glide". This value is called the reference low frequency.

In the case of a device in a beacon, one input of the device is used, placed at a location where the signal C+SB is not summed with a signal SBO. The result of the calculation operations is assigned to this reference low frequency channel.

In the case of a device in an onboard receiver, one of the characteristics of the transmitted signal is used to calculate the reference low frequency signal. The input signal of a receiver is the sum of the signals transmitted by a set of antennas. By the very nature of the ILS system, the signal is deemed to have no SBO component for the main axis of the "Localiser" station at zero degrees azimuth (theoretical plane of the points DDM=0) and for the main axis of the "Glide" station, namely its glide path (theoretical points of the plane DDM=0). When using ILS, aircraft are moving continually between angular sectors in which there are SBO and main axes (theoretical plane or DDM=0) where there are no SBO but only SB. The times at which the resultant phase crosses 0° are then detected in order to store the reference low frequency value.

If components of beacons are imperfect, for example if the left and right half-arrays are not equal in amplitude or if the reflection coefficient of the ground is not equal to one, residual components of SBO signals remain on the main axes. The essential characteristic of these imperfections is that these residual components are necessarily in phase quadrature to the phase observed off the main axes, namely in the angular sectors. Moreover, the SBO from the 90 Hz frequency have the opposite phase to the SBO from the 150 Hz frequency.

The time of the characteristic relative phase rotation of ±90° is therefore used as the decision time to store the reference low frequency value. The effective variation is 90° at ±ξ°. The error ξ° is proportional to the aforementioned imperfections in the components of the beacon and its environment.

After determining the reference low frequency value in phase, identical to C, and in amplitude, the projections are determined:

cos__ref=Ref LF modulus*cos (ΦSB__ref)

sin__ref=Ref LF modulus*sin (ΦSB__ref)

The values of the signal SBO are then determined from the following calculations:

cos__SBO=cos__sum−cos__ref sin__SBO=sin__sum−sin_ref where cos__sum and sin__sum are respectively the projections of the sum vectors of the vectors $$\vec{SB} \text{ and } \vec{SBO}$$

at the output of each filter, $$SBO \text{ modulus} = \sqrt{(\cos\_SBO)^2 + (\sin\_SBO)^2}$$

and

Φ__SBO=Arc tan (sin__SBO/cos__SBO)

Finally, the phase difference between the carriers and the SBO signals is determined:

Δ__Φ=Φ__SBO−Φ__CSB

These calculations are performed for all the basic signals generated by the analysed station. The processing could be done for the harmonics of the basic signals to determine from which transmitter they originated.

Search for carriers present in the signal and servo-locking of carriers

The foregoing description assumes that the frequencies of the synthesisers are locked to the signal to be analysed. For this, it is first necessary to find the carriers present in the signal x(t) and to tune the frequencies of the synthesisers to these carriers.

This tuning is frequency tuning. The method of the invention does not require phase locking. Tuning is easily obtained by means of the analysis done by the computer. An analogue system could be used with phaselocked loops tuned to each of the carriers contained in x(t).

The frequency value with the maximum level is searched for in a block of data from the filter function. The presence of one or more SB or SBO at (F−fn) and (F+fn) is searched for on either side of this frequency F. If at least one of the SB or SBO frequencies searched for is obtained, the amplitude and the frequency F and the amplitude of the SB are stored in memory. The frequency of the synthesiser is shifted by a value equal to twice the width of the low-pass filters and the sequence is repeated until the number of bands analysed corresponds to the width of the channel of the beacon.

Once the search for the carriers has been completed, the two carriers having the highest level are selected and the synthesisers are locked to these frequencies. The sequences for calculating the components C, SB, SBO are then executed continuously. The other carriers detected containing SB or SBO components then reveal the presence of jamming.

Of course, many variants will be evident to the person skilled in the art. For example, this step of searching for carriers could be performed continuously by a dedicated demodulator. Similarly, this search sequence could be carried out on starting up the device of the invention after which the frequency errors found during interpolation calculations would be used to resynchronise the synthesisers, in a "carrier control" step.

At this stage of operation, the equation of the signal x(t) is therefore known for all these basic components. In other words, the amplitude, phase and LF or RF frequency are known for each component C, SB, SBO. Additional calculations are then effected by the devices implementing the method of the present invention, on the basis of the characteristic values of the basic signals as analysed hereinabove.

If a single demodulator is used, synchronisation is to each carrier present in the channel of the beacon alternately. This loses the concept of real time corresponding to the continuous analysis of the various carriers present in the channel.

Calculations specific to guidance

The navigation, angular error information is determined from the elementary components analysed previously, by two different methods. The first method consists in supplying information as would be supplied by a prior art system or method based on a quadratic demodulator. "DDM" represents the difference of depth of modulation and "SDM" the modulation sum, in the manner well known in itself. For this, in the case of an ILS beacon, a depth of modulation M90 and M150 corresponding to f1=90 Hz and f2=150 Hz is determined for each radio frequency Fn in the equation x(t), such that:

$$M90 = (m1 + m'1 * \cos \Delta\Phi\_90)$$

$$M150 = (m2 + m'2 * \cos \Delta\Phi\_150)$$

$$DDM\_Fn = M90 - M150$$

$$SDM\_Fn = M90 + M150$$

$\Delta\Phi\_90$ and $\Delta\Phi\_150$ representing the phase difference between the signals SBO and C+SB respectively generated by the signals at f1=90 Hz and f2=150 Hz. These phase angles are the instantaneous values from each of the data blocks produced by the FFT calculation for the two carriers having the highest level in the analysed channel F0 and F1.

The following are then calculated:

the ratio K=amplitude of F1/amplitude of F0 then the guidance information proper resulting from the capture effect:

Guidance DDM=(DDM_F0+DDM_F1*K)/(1+K$^2$)

Guidance SDM=(SDM_F0+SDM_F1* K)/(1+K$^2$)

where DDM_F0 and SDM_F0 relate to the carrier of frequency F0 in the x(t) equation and DDM_F1 and SDM_F1 to the frequency F1 in x(t). This guidance information is "standard" information.

The second method consists in supplying to the user guidance information enhanced with characteristics obtained by the method of the invention.

The depths of modulation M90 and M150 are conventionally calculated but this time taking the angles $\Delta\Phi\_90$ and $\Delta\Phi\_150$ as the average over a series of filter operations, not as the instantaneous values after FFT type filtering. To calculate the average the angles $\Delta\Phi$ are complemented ±90° if the acquisitions correspond to physical points with DDM=0. Another solution is to ignore them. The fact of applying filtering (in our case by averaging, although any other technique may be used) to the successive phase-shifts of the signals SBO relative to C considerably reduces guidance errors due to "multi-path" signals, which error is known as "scalloping". The capture effect is then calculated by incorporating a test function, i.e. comparison of the DDM information of the highest field carrier component with a predetermined threshold. If the highest field DDM has an absolute value lower than the predetermined threshold, the following values are taken:

Guidance DDM=DDM of highest field component,

Guidance SDM=SDM of highest field component.

Otherwise, the "standard" capture effect calculation is effected.

This method eliminates guidance errors due to multi-path signals of the dualrequency type that are well known to lead to at least an offset error in the guidance DDM.

For VOR type guidance signals the calculations known in themselves in this art are effected, consisting in measuring the phase difference between the variable 30 Hz LF signal and the reference 30 Hz signal obtained by frequency demodulation of the 9 960 Hz side bands.

Figure 3:
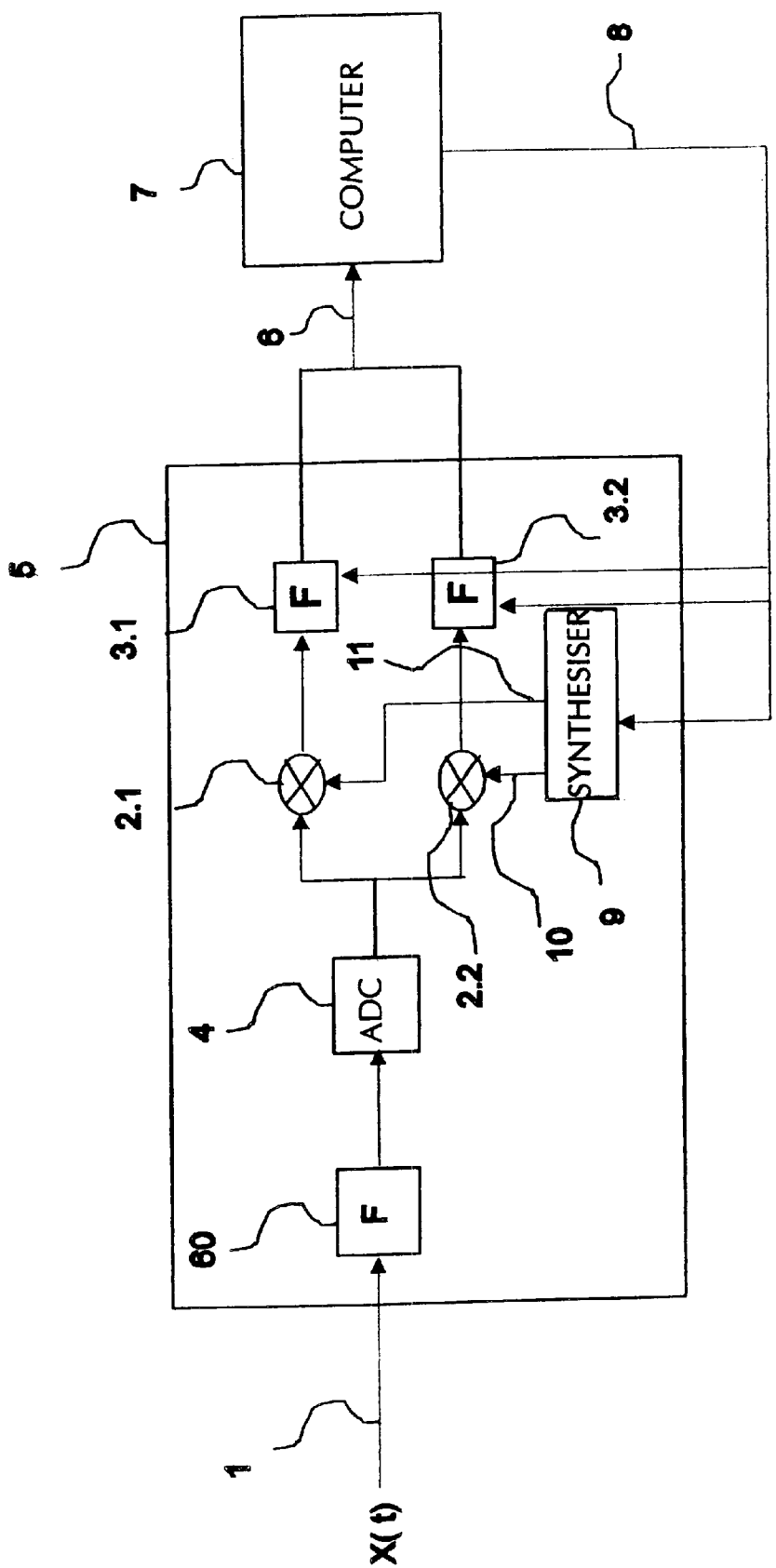
FIG. 3 is a functional block diagram of one embodiment of an analyser device in accordance with the invention.

FIG. 3 of the accompanying drawings shows one embodiment of a digital phase quadrature demodulator device of the invention.

The device includes an anti-aliasing low-pass filter 60, an analogue-digital converter 4, two digital multipliers 2.1 and 2.2, two digital filters 3.1 and 3.2, a computer 7, a synthesiser consisting of a numerically controlled oscillator 9, two digital buses 6 and 8.

The signal x(t) is injected into the input 1 and filtered by the low-pass filter 60 serving as an anti-aliasing filter. The signal x(t) is sampled with the analogue-digital converter 4. By placing the converter on the input side of the multipliers in this way, the invention circumvents any temperature drift and asymmetry of the two multipliers and the outputs of the oscillator 9. The sequence of digital samples representing the signal x(t) is then multiplied on a cosine channel by a multiplier 2.2 and on a sine channel by a multiplier 2.1. In accordance with the invention, the inputs of the multipliers 2.2 and 2.1 are fed with signals of frequency F in phase quadrature. The signals F are obtained from a numerically controlled oscillator NCO 9. The sine and cosine channels are filtered using undersampling low-pass digital filters 3.1 and 3.2. These filters are of variable width and identical in all respects on the two channels. The signal is transmitted to the computer 7 via the digital bus 6. The stream of data arriving at the computer is in a ratio N to the stream of data available at the converter output, the ratio N being set at the digital filters in accordance with the processing capacity available on the selected computer. The base signals are analysed by the method of the invention. The oscillator 9 is controlled from the computer 7 via the control bus 8.

The phase quadrature digital demodulator 5 is made up of the anti-aliasing filter, the analogue-digital converter, the two multipliers, the two low-pass digital filters and the oscillator.

All of the digital demodulation and analysis functions can be performed in accordance with the method of the invention, directly by software processing within the computer 7, provided that the latter has sufficient processing power, the hardware part being then limited to the anti-aliasing filter, the analogue-digital converter and the computer.

Figure 4:
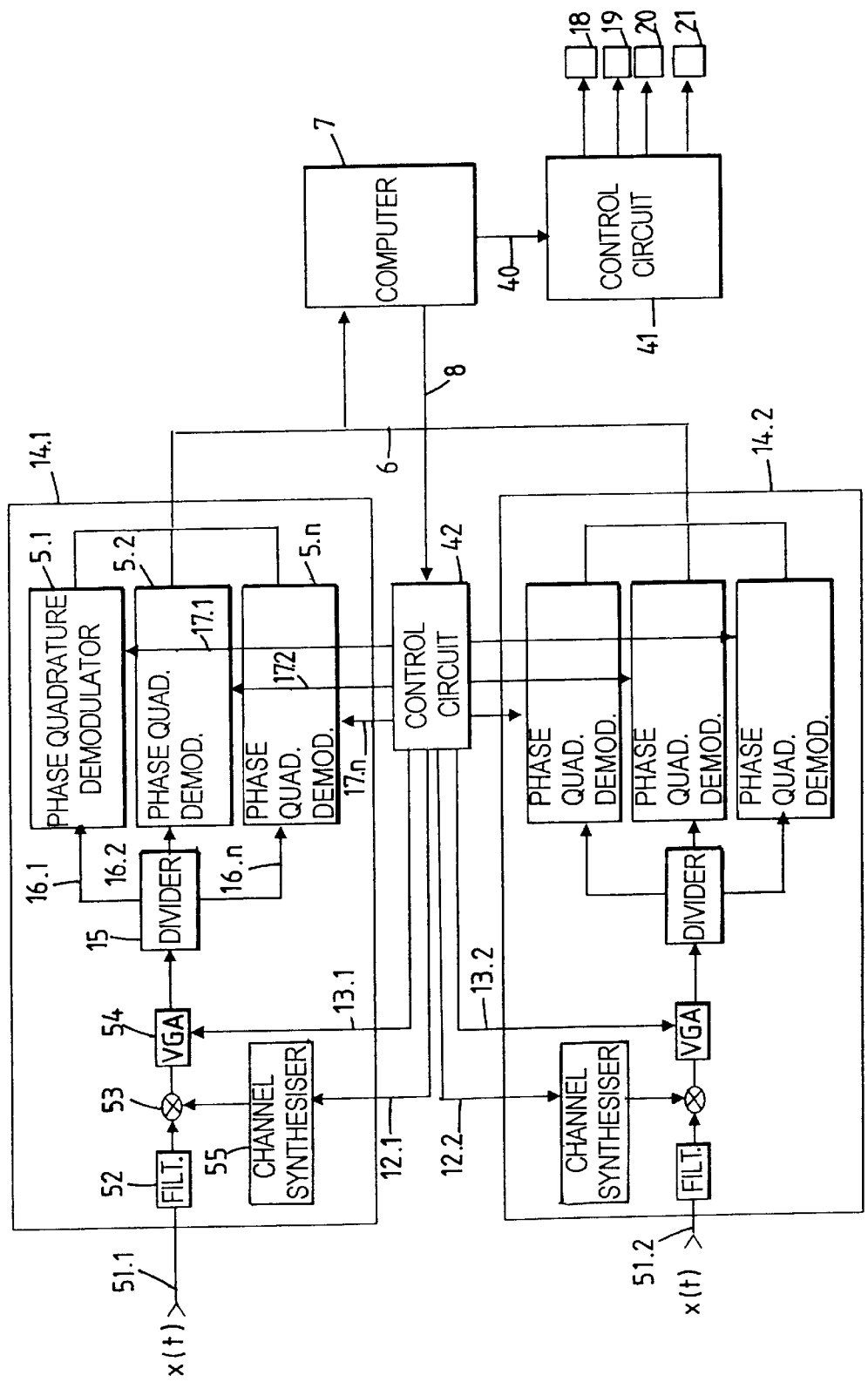
FIG. 4 is a functional block diagram of one embodiment of a radio navigation receiver equipped with the device of the invention.

The accompanying FIG. 4 is a functional block diagram of one embodiment of a radio navigation receiver equipped with the device of the invention.

The receiver comprises a plurality of measurement channels 14.1 through 14.n. Conventionally, each channel includes a band filter 52, a mixer 53, a channel synthesiser 55. This synthesiser can be replaced with a simple oscillator if the receiver is used on only one channel. The receiver also includes a bus 40 connecting the computer 7 to a control circuit 41 and a control circuit 42 for the various modules. In accordance with the invention there is also a plurality of phase quadrature demodulators 5.1 through 5.n and an adapter and divider circuit 15.

The signal x(t) from the "Localiser" and VOR beacons is injected into the input 51.1 of the VHF channel 14.1. The signal x(t) from the "Glide" beacons is injected into the input 51.2 of the UHF channel 14.2.

In the channels 14.1 and 14.2:

the signal x(t) is filtered using a band-pass filter 52, the signal x(t) is transposed to an intermediate frequency by the mixer 53 and the channel synthesiser 55, the transposed signal x(t) is amplified by a variable gain circuit 54, the signal from the amplifier is divided by the divider circuit 15 into a number n of channels 16.1 through 16.n. The n channels correspond to each carrier F contained in the signal, including any jamming signals, the n channels are demodulated using the phase quadrature digital demodulators 5.1 through 5.n of the invention, the n demodulated channels are transmitted to the computer 7 via the digital bus 6, the set point commands are transmitted from the computer 7 to the control unit 42 via the digital control bus 8. The buses 6 and 8 can be one and the same bus, the commands are transmitted from the circuit 42 to the channel synthesiser 55 via the bus 12.1, to the variable gain amplifier 54 via the bus 13.1, to the NCO of the demodulators 5.1 through 5.n via the buses $17_1$ through $17_n$, the calculation sequences of the invention are executed for channels 14.1 and 14.2 and the guidance information displayed at 18, 19, 20 and 21 is transmitted to the control system via the circuit 41 controlled by the computer. The control circuit 41 is made up, for example, of digital-analogue converters with their associated circuits for feeding the standard inputs of the control systems and indicators, including the azimuth and bearing error indicators 18, 17 and the azimuth Flag and bearing Flag error indicators 20, 21, the values of the basic components of the equation for the signal x(t), that is to say each component C, SB, SBO, described by its amplitude, its phase, and its LF or RF frequency, obtained from the processing in accordance with the invention to effect, in addition to the calculations specific to guidance, the calculations specific to the receiver. For the latter:

the frequency spacing of the selected carriers is calculated. The latter are stored in the table of searched frequencies. The frequency spacing is compared to the applicable standards and a Flag alarm is tripped if the spacing is out of limits;

the level spacing, capture ratio, of the selected carriers is calculated. The latter are stored in the table of searched frequencies. The spacing is compared to the applicable standards and a Flag alarm is tripped if the spacing is out of limits;

it is determined if the number of carriers present on the channel is greater than the number expected, in which case a Flag alarm is displayed that corresponds to the detection of a jamming signal;

the width of the low-pass filters of the demodulators is adjusted to exactly the bandwidth necessary to improve the signal to noise ratio (known as the N ratio);

the calculations specific to guidance are effected.

The present invention also provides a beacon maintenance and diagnostic tool for monitoring the integrity of the signals transmitted by the beacon. This tool, shown in FIG. 5, has essentially the same structure as the navigation receiver described with reference to FIG. 4. However, the tool further comprises a plurality of multichannel couplers connected between the various functional units of the stations to locate any faults. FIG. 6 shows in detail a multichannel coupler block integrated into the maintenance device from FIG. 5.

Figure 5:
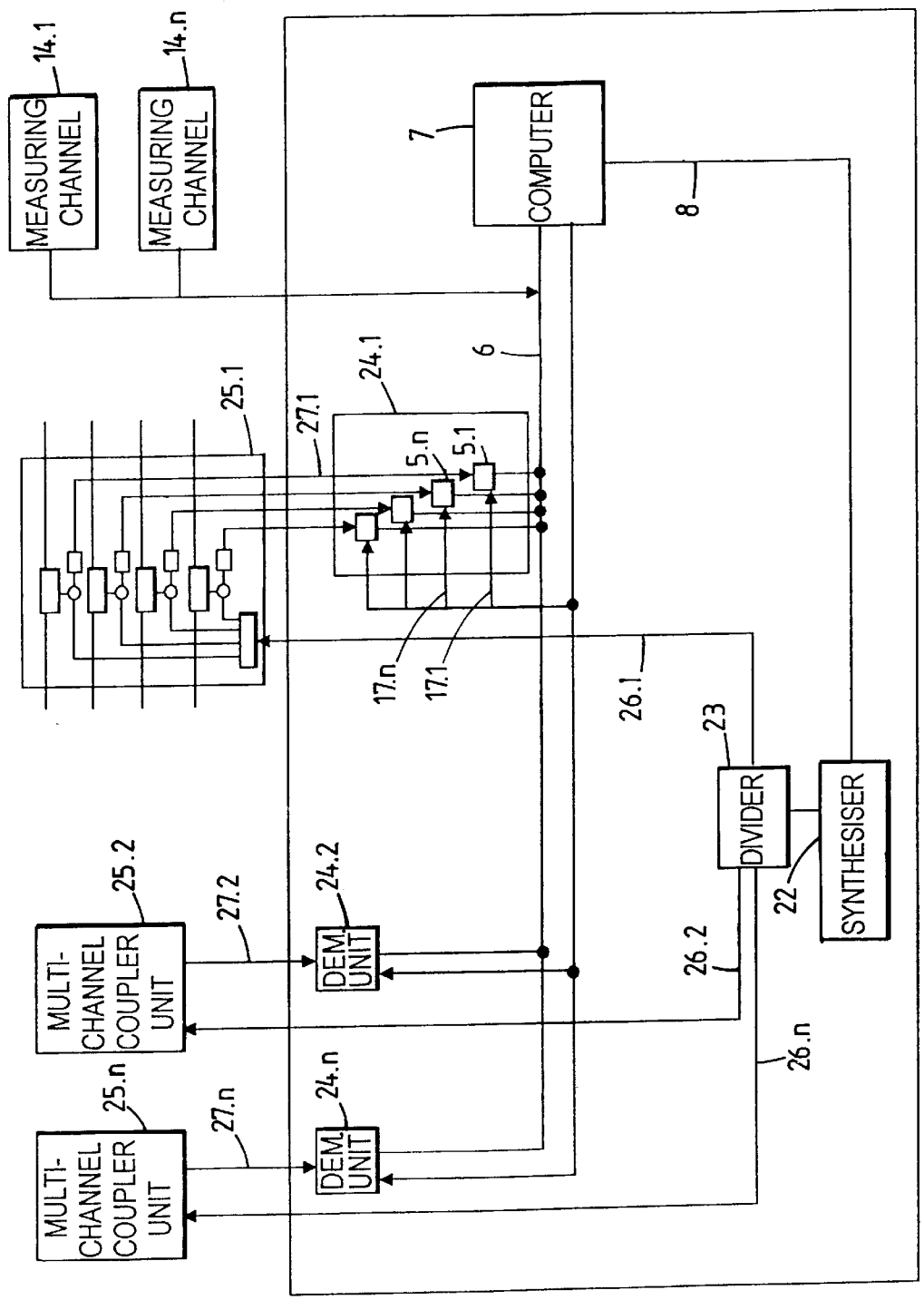
FIG. 5 is a functional block diagram of one embodiment of a diagnostic and maintenance tool equipped with the device of the invention, this diagram applying equally to a radio navigation beacon equipped with a tool of this kind.
Figure 6:
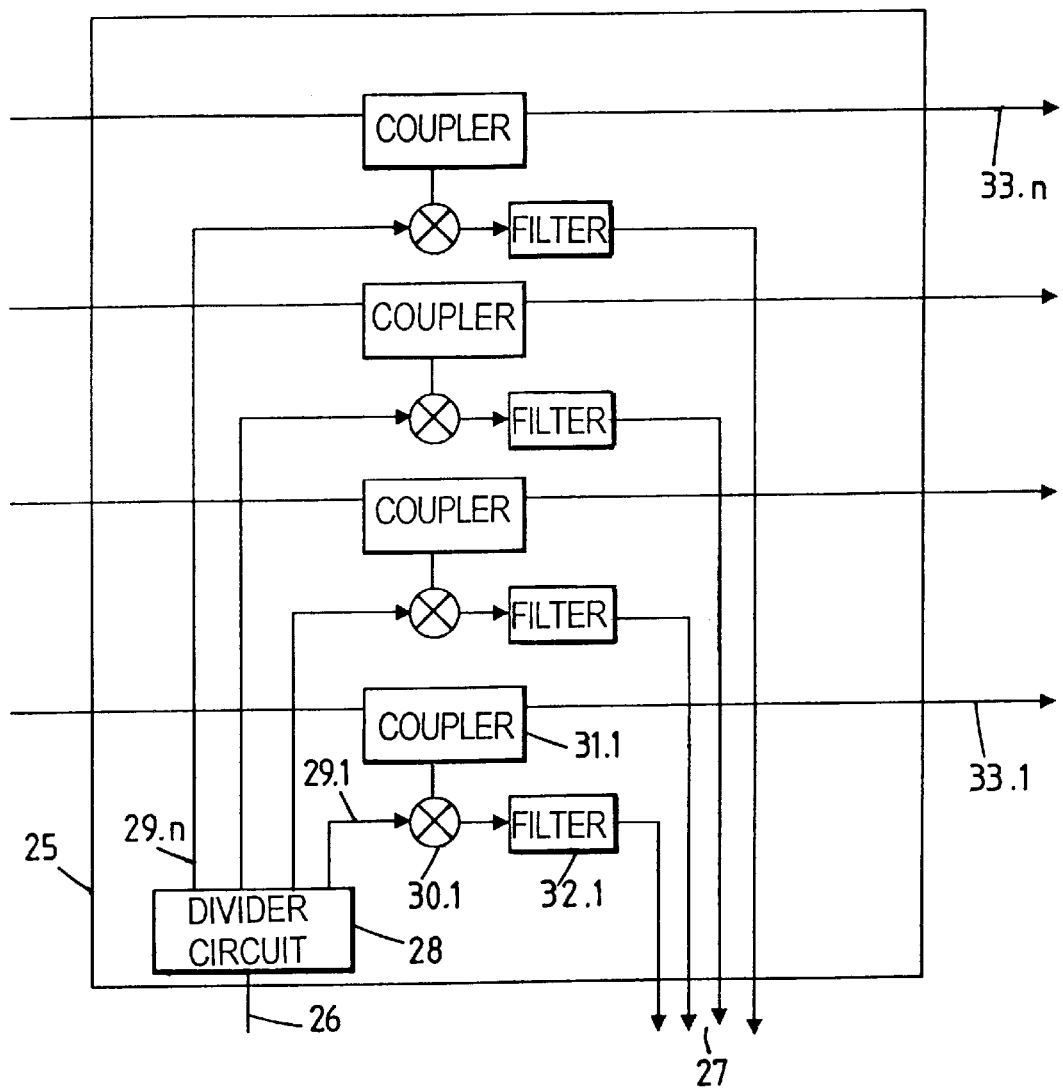
FIG. 6 is a functional block diagram of one embodiment of a multichannel coupler in accordance with the invention, this coupler enabling measurement of signals at various points of the beacon.

FIG. 5 of the accompanying drawings is a functional block diagram of one embodiment of the maintenance and diagnostic tool of the invention, this diagram applying equally to an embodiment of a device for monitoring the integrity of the signals radiated by the beacons, adapted to be integrated into the latter.

The diagnostic tool includes:

measuring channels 14.1 through 14.n as described with reference to FIG. 4. These measure the signals radiated by the beacon at various points in the field of the beacon. The signals received by the channels are delivered to the computer 7 where they are processed to diagnose faults external to the beacon (variation in the reflection coefficient of the ground plane, antenna transmission coefficients, inclination of the antenna pylon, etc);

a plurality of multi-channel coupler units (25.1 through 25.n);

a plurality of phase quadrature demodulator units 24.1 through 24.n;

a synthesiser 22 for selecting the beacon channel;

a divider circuit 23;

a computer 7;

various digital control buses 8, 17.1 through 17.n and digital connection buses 6, 27.1 through 27.n.

The multichannel couplers, which are of the conventional electromagnetic type, for example, are disposed between the various functional units of the beacon, as referred to in the preamble of the present description. The aim is, in accordance with the invention, to locate beacon malfunctions in one or other of these units.

The synthesiser 22 is locked to the beacon channel. The signal from the synthesiser is divided by the divider 23 into the same number of outputs as there are multi-channel couplers needed to locate a fault in the beacon. The transposed signals are sampled in the multi-channel coupler units 25.1 through 25.n and injected into the phase quadrature demodulators 5.1 through 5.n.

For simplicity, only one phase quadrature demodulator unit has been shown for only one measurement channel. There are as many demodulators per channel as required, depending on the beacon. Two demodulators are generally installed per channel in the case of dual-frequency beacons. The divider circuit can be replaced by a switch circuit with one input and the same number of outputs as there are couplers. This reduces the power needed at the output of the channel synthesiser. Multiplexer circuits can be interleaved between the outputs of the multi-channel coupler units 25.1 through 25.n and the inputs of the demodulators 5.n to reduce the number of the latter.

Each time a switch or multiplexing circuit is inserted, the concept of real time analysis is lost, without loss of information from the various signals analysed. The processing in accordance with the invention is applied by means of the computer 7. The signals are sampled upstream and downstream of each of the functional units constituting the stations, by means of the multi-channel couplers, so that any errors or drifts can be identified. To do this, the values calculated from new samples are compared with calculation values previously stored in memory or with set point values fixed by the user. If errors are found, the source is assigned to the unit in question.

FIG. 6 of the accompanying drawings is a functional block diagram of one multi-channel coupler unit (25) forming part of the device from FIG. 5.

The multi-channel coupler unit from FIG. 6 includes a divider circuit 28 and, for each of the measurement branches 29.1 through 29.$n$ connected to the outputs of the divider, a multiplier 30.$i$, a coupler 31.$i$, of the electromagnetic type, for example, and a low-pass filter 32.$i$ ($i$=1 through $\underline{n}$).

The "local oscillator" input 26 ("LO" signal) is divided into a number of branches 29.$i$ corresponding to the number of channels to be analysed. There are generally 2, 3 or 4 channels, with no upper limit. Part of the signal on measurement channel 33.$i$ is sampled using a coupler 31.$i$. The sampled signal is mixed with the signal 29.$i$ from the divider 28 at the "LO" input 26. The low-pass filter 32.$i$ eliminates the sum frequency from the mix, retaining the difference frequency IF, which is injected into the phase quadrature demodulator.

The analysed signals on the channels 33.$i$ are therefore transposed to an intermediate frequency IF lower than the station frequency at the outputs 27 of the couplers. This transposition has the advantage that the relative phases between the measurement channels are not affected by any error due to the differences in the relative lengths of the connecting cables between the multichannel couplers and the phase quadrature demodulators. Also, this change of frequency guards against spurious coupling between the measurement points and the demodulators by radiation from the station, which could affect the accuracy of the device.

I claim:

1. Method of analysing transmissions from a radio navigation beacon, these transmissions comprising at least one carrier (C+SB) comprising side bands (SB) and a side band only signal (SBO), said carrier and said signal having any phase relationship, wherein:

the sum of the carrier (C+SB) and the signal (SBO) is demodulated by multiplication with a frequency (F) and with the same frequency is phase quadrature, DC components representative of the part (C) of the carrier (C+SB) and the low-frequency components of these transmissions from the beacon representative of the SB parts of the carrier (C+SB) and the signal (SBO) are extracted from these products, a modulus and a phase of the part C of the carrier (C+SB) are calculated, and the amplitude of the side bands (SB) and the amplitude and the phase of the signal (SBO) are deduced from the low-frequency components.

2. Method according to claim 1, used in a guidance receiver on board an aircraft to generate DDM and SDM guidance signals, wherein the amplitude and the phase of the signals SB and SBO at the same low frequency LF are determined using a rotation characteristic of the phase of the signal SBO relative to that of the signal C+SB operative when the aircraft crosses the theoretical zero DDM plane.

3. Method according to claim 1, used in a guidance receiver on board an aircraft to generate DDM and SDM guidance signals, wherein the guidance DDM is taken to be identical to the DDM extracted from the highest field carrier (C+SB).

4. Method according to claim 1, applied to the guidance of an aircraft by using signals DDM and SDM obtained by processing signals transmitted by the beacon, wherein the DDM and SDM information is determined by phase filtering the signals (SBO) and (C+SB).

5. Method according to claim 1, wherein the carrier containing (SB) or (SBO) information within a beacon channel are determined in order to determine the presence of jamming signals.

6. Device for analyzing transmissions from a radio navigation beacon, these transmissions comprising at least one carrier (C+SB) comprising side bands (SB) and a side band only signal (SBO), said carrier and said signal having any phase relationship, said device comprising:

a) multiplier means (2.1,2.2) for demodulating the sum of the carrier (C+SB) and the signal (SBO) by multiplication with a frequency (F) and with the same frequency in phase quadrature, b) filter means for extracting from these products DC components representative of the (C) part of the carrier (C+SB) and the low-frequency components of the transmissions from the beacon representative of the (SB) parts of the carrier (C+SB) and of the signal SBO, and c) means (7) for calculating a modulus and a phase of the part C of the carrier (C+SB), the amplitude of the side bands (SB) and the amplitude and the phase of the signal (SBO) from the low-frequency components of the transmissions from the beacon.

7. Device according to claim 6, further comprising an analogue-digital converter (4) for converting signals received from the beacon on the input side of the multipliers (2.1, 2.2).

8. Device according to claim , further comprising adjustable digital filters (3.1, 3.2) at the output of the multipliers (2.1, 2.2) for eliminating the sum signal formed at the output of the multipliers.

9. Device according to claim 6, further comprising a plurality of phase quadrature demodulators (5.1 to 5.*n*) each locked to one carrier present in the transmissions from the beacon, at least one of said demodulators being assigned to detection of jamming signals.

10. In a radio navigation receiver, a device for analyzing transmissions from a radio navigation beacon, these transmissions comprising at least one carrier (C+SB) comprising side bands (SB) and a side band only signal (SBO), said carrier and said signal having any phase relationship, said device comprising:

a) multiplier means (2.1, 2.2) for demodulating the sum of the carrier (C+SB) and the signal (SBO) by multiplication with a frequency (F) and with the same frequency in phase quadrature, b) filter means for extracting from these products DC components representative of the (C) part of the carrier (C+SB) and the low-frequency components of the transmissions from the beacon representative of the (SB) parts of the carrier (C+SB) and of the signal SBO, and c) means (7) for calculating a modulus and a phase of the part C of the carrier (C+SB), the amplitude of the side bands (SB) and the amplitude and the phase of the signal (SBO) from the low-frequency components of the transmissions from the beacon.

11. In a radio navigation beacon diagnostic tool, a device for analyzing transmissions from a radio navigation beacon, these transmissions comprising at least one carrier (C+SB) comprising side bands (SB) and a side band only signal (SBO), said carrier and said signal having any phase relationship, said device comprising:

a) multiplier means (2.1, 2.2) for demodulating the sum of the carrier (C+SB) and the signal (SBO) by multiplication with a frequency (F) and with the same frequency in phase quadrature, b) filter means for extracting from these products DC components representative of the (C) part of the carrier (C+SB) and the low-frequency components of the transmissions from the beacon representative of the (SB) parts of the carrier (C+SB) and of the signal SBO, and c) means (7) for calculating a modulus and a phase of the part C of the carrier (C+SB), the amplitude of the side bands (SB) and the amplitude and the phase of the signal (SBO) from the low-frequency components of the transmissions from the beacon.

12. The device of claim 11, comprising a plurality of demodulator units (24.1 to 24.*n*) made up of demodulators (5.1 to 5.*n*), each unit being adapted to be connected to a particular measurement point of a beacon, the outputs of the demodulators (5.1 to 5.*n*) of each unit being processed in a computer (7) to identify and to quantify malfunctions of the beacon.

13. The device of claim 11, further comprising a plurality of channels (14.1 through 14.*n*) for measuring signals radiated by the beacon at various points in the field of said beacon, said signals being introduced into the computer (7) to diagnose faults external to the beacon.

14. The device of claim 11, further comprising a plurality of coupler units (25.1 to 25.*n*) each adapted to be connected to one of said measurement points of the beacon, each coupler unit including means (26, 30.1 to 30.*n*, 32.1 to 32.*n*) for transposing the frequency of the signals from the beacon to a plurality of intermediate frequencies (IF).

15. The device of claim 11, in a radio navigation beacon diagnostic tool for diagnosis and monitoring the integrity of the signals that it transmits.

* * * * *